SLEEVE SUPPORTED ELECTRODE FOR WELL LOGGING

Original Filed Sept. 21, 1949 5 Sheets-Sheet 1

Alexander B. Hildebrandt Inventor

By W. O. Talman Attorney

SLEEVE SUPPORTED ELECTRODE FOR WELL LOGGING

Original Filed Sept. 21, 1949 5 Sheets-Sheet 2

Alexander B. Hildebrandt Inventor

By W. O. Hilmer Attorney

SLEEVE SUPPORTED ELECTRODE FOR WELL LOGGING

Original Filed Sept. 21, 1949 5 Sheets-Sheet 3

Alexander B. Hildebrandt Inventor

By W. O. Teelman Attorney

SLEEVE SUPPORTED ELECTRODE FOR WELL LOGGING

Original Filed Sept. 21, 1949 5 Sheets-Sheet 4

Alexander B. Hildebrandt Inventor

By W. O. Hilman Attorney

Feb. 24, 1953 A. B. HILDEBRANDT Re. 23,621

SLEEVE SUPPORTED ELECTRODE FOR WELL LOGGING

Original Filed Sept. 21, 1949 5 Sheets-Sheet 5

Alexander B. Hildebrandt Inventor

By W. O. Teilman Attorney

Reissued Feb. 24, 1953

Re. 23,621

UNITED STATES PATENT OFFICE 23,621

SLEEVE SUPPORTED ELECTRODE FOR WELL LOGGING

Alexander B. Hildebrandt, Tulsa, Okla., assignor to Standard Oil Development Company, a corporation of Delaware Original No. 2,552,428, dated May 8, 1951, Serial No. 117,053, September 21, 1949. Application for reissue September 26, 1952, Serial No. 311,816

8 Claims. (Cl. 175—182)

Matter enclosed in heavy brackets [ ] appears in the original patent but forms no part of this reissue specification; matter printed in italics indicates the additions made by reissue.

This invention is concerned with apparatus for the electrical logging of bore holes in the earth, such as oil wells, and more particularly with an improved type of electrode for use in electrical logging to determine the nature of strata encountered by a bore hole.

Methods and apparatus for the logging of bore holes by measuring impedance self potentials, resistance or some other electrical property of the various strata through which the bore hole passes are well known. Some of these are described for example in the Schlumberger patents such as 1,819,923; 1,894,328; 1,913,293 and 2,165,013. These methods involve the lowering of one or more electrodes into a bore hole filled with water or with aqueous drilling mud, sending currents into the formation and observing the electrical phenomena produced.

One of the more common procedures is to make electrical measurements indicative of the difference in apparent resistivity of the various types of rocks encountered as the electrodes are raised up through the bore hole. A particular difficulty arising in such measurements, however, is that the resistivity of the mud or water in the bore hole enters into the measurement and in some instances causes anomalous or misleading results, as will be explained more fully hereinafter.

It is one object of the present invention to provide an electrode assembly for electrical well logging which will eliminate or minimize the sources of error in conventional methods of electric logging of bore holes. Another object of the invention is to provide well logging electrodes which will be substantially shielded electrically from the mud column in a well and thus substantially eliminate erroneous well logging readings.

Other and further objects and advantages of this invention will be apparent from the ensuing description taken in conjunction with the accompanying drawing in which Fig. 1 is a vertical cross sectional view of a section of a bore hole together with the conventional apparatus placed therein and on the earth's surface for making an electric log of the bore hole and illustrating particularly the disadvantage of the conventional well logging procedure.

Figs. 2 and 3 are vertical cross sectional views of a bore hole with the electrode assembly of the present invention suspended therein, the assembly being depicted in cross section in its initial or closed condition for lowering into the bore hole, Fig. 3 representing a lower continuation of Fig. 2;

Figs. 4 and 5 correspond to Figs. 2 and 3 and show the assembly in its operating or open position for traveling up the bore hole and making an electric log thereof;

Figure 1:
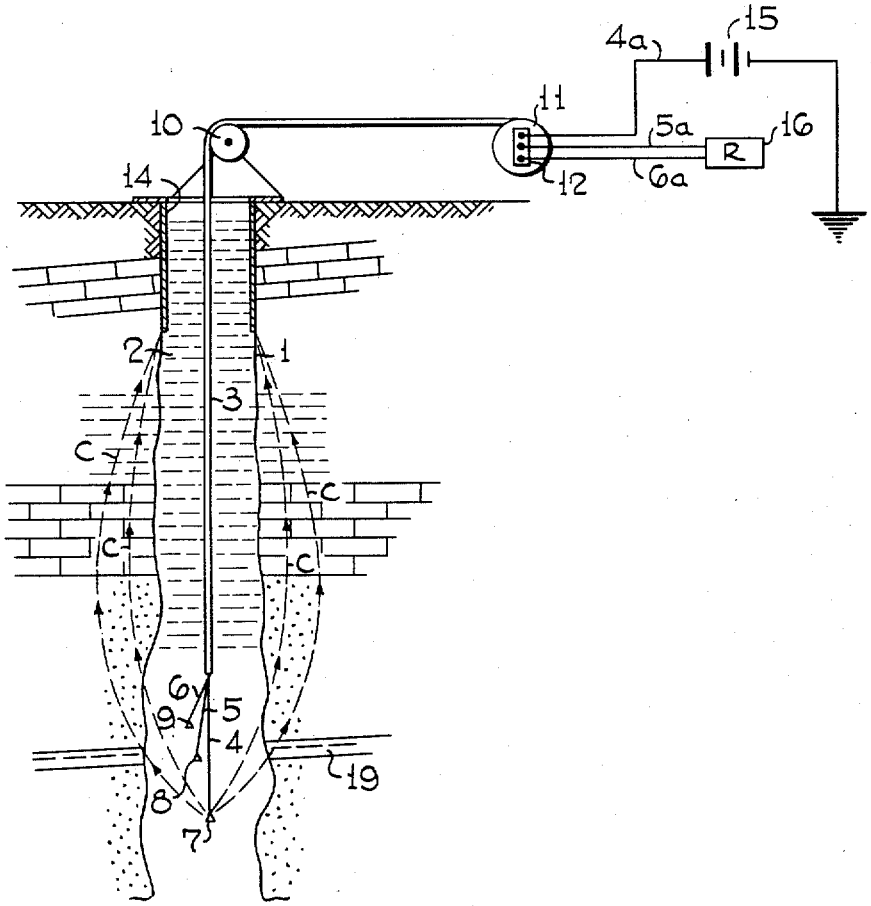

Referring to the drawing in detail and in particular to Fig. 1 thereof, reference numeral 1 denotes a bore hole filled with drilling mud 2 and into which is suspended a cable 3 carrying a plurality of conductors 4, 5, 6, each having an electrode 7, 8, 9. The cable is supported over the bore hole on a pulley 10 and is wound onto a reel 11. By suitable collector rings 12, electrical contact is made between conductors 4a, 5a, 6a and the corresponding conductors 4, 5 and 6 in cable 2. Conductor 4a is connected to one terminal of potential source 15, the other end of which is connected to ground. Surface casing 14 may suitably serve as the ground electrode. Conductors 5a and 6a connect into a recording potentiometer or similar recording device 16 provided with means for feeding a roll of paper past a recording stylus or the like in proportion to the length of cable being wound on reel 11. Means for measuring the length of cable in the bore hole and the tension on the cable, and for relating the recording paper movement to the movement of the cable, are not depicted here, as these devices are conventional and their description is not pertinent to the discussion of the present invention.

The theory of formation resistivity measurements is fully explained in the aforementioned Schlumberger patent, 1,819,923 and is briefly as follows: Current enters the ground through electrode 7 and flows to the ground electrode, i. e. the surface casing 14. The flow of electrical current is represented by lines c. Now if the distances from electrode 7 to electrode 8 and from electrode 7 to electrode 9 are relatively large with respect to the diameter of the bore hole, say 10 to 20 times said diameter, there will be created a difference in potential between electrode 8 and 9, which can be measured with recording means 16. The assumption is made, as pointed out by Schlumberger, that the current flowing from electrode 7 produces by ohmic effect equipotential surfaces which are essentially spherical surfaces centered on electrode 7. It is assumed that since the cross sectional area of the bore hole is small compared to the distances from electrode 7 to electrodes 8 and 9 there is no appreciable deformation of the spheres by the column of water or drilling mud in the bore hole, so that the measure of potential between electrodes 8 and 9 is equivalent to a measure of the difference in potential in the adjacent formation at equivalent distances from electrode 7.

The resistivity measured by the above method is approximately the real resistivity only if it is assumed that the formations in the vicinity of the electrodes 7, 8 and 9 are homogeneous and that the effect of the column of mud or water is negligible. Such is not the case, however, and in actual practice what is measured is not the real resistivity but what is called "apparent resistivity," influenced by both the resistivity of the drilling mud and the different types of rocks encountered. Nevertheless, rock layers having differences in resistivity are detected with reasonable accuracy by means of the usual apparent resistivity measurements. However, when it is desired to obtain indication between different layers with a high degree of definition, especially when the layers are relatively thin, the resistivity of the drilling mud or water relative to the resistivity of the formation layers enters into the picture. For example, if a thin bed 19 of high resistivity is encountered, its presence may not show up on the record, because of the short circuiting of current through the drilling mud from electrode 8 to electrode 9, giving a resistivity reading which will be lower than would be obtained if the resistivity through layer 19 were the only factor.

Figure 2:
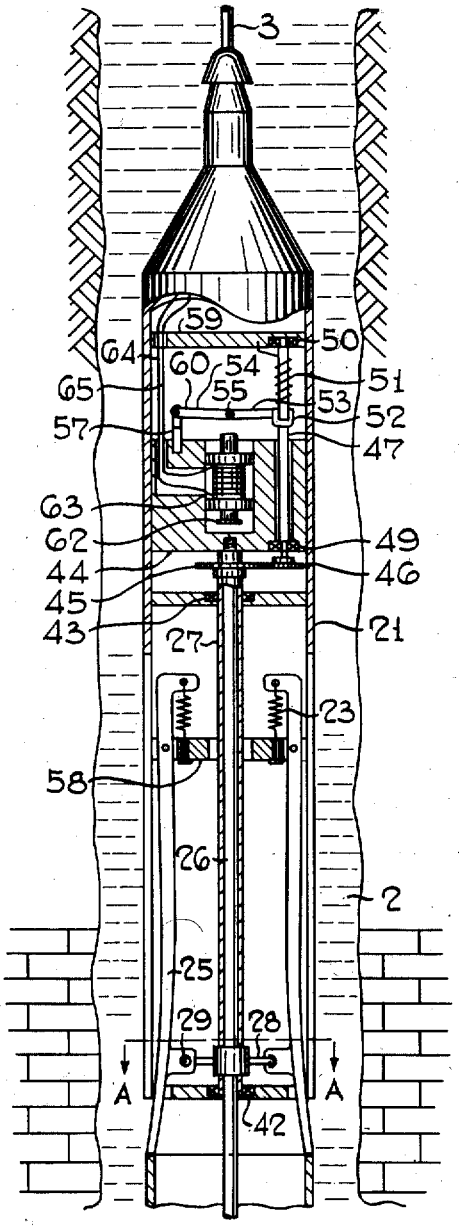
Figure 3:
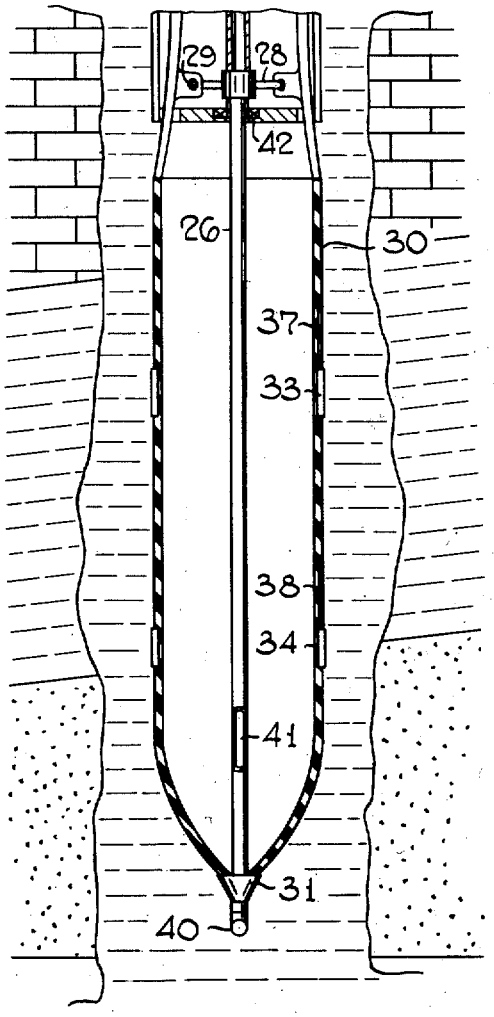
Figure 6:
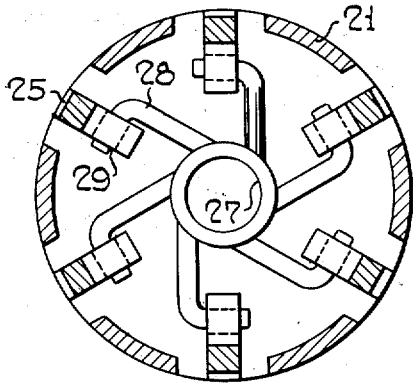
Fig. 6 is a cross sectional view along line A—A of Fig. 2.

Reference will now be made to the remaining figures of the drawing, showing the features of the present invention. Referring particularly to Figs. 2 and 3, a case 21 is suspended by cable 3 in a bore hole 1 filled with drilling mud 2. Pivotally attached to the lower end of case 21 are a plurality of arms 25. A centrally disposed elongated rod member 26 is screwed into base 44 in case 21. Slidably fitted over rod 26 is a rotatable sleeve 27 provided at its lower end with curved pins 28 adapted to engage holes 29 at the lower ends of arms 25 and to release said arms upon rotation of sleeve 27. This is shown in detail in Fig. 6, which is a cross-sectional view along line A—A of Fig. 2. The mechanism for rotating sleeve 27 to release arms 25 is contained in case 21 and will be described in more detail later in the specification.

Attached to the lower end of the arms 25 is a flexible, *open, elongated,* rubberized sleeve 30 extending for almost the full length of rod 26 as shown in Fig. 3. Sleeve 30 is yieldably fastened at its lower end to rod 26 by fastening means 31. Embedded in the wall of sleeve 30 are a plurality of sets of electrodes, 33, 34, all of the electrodes 33 being electrically connected and all of the electrodes 34 being electrically connected. Insulated leads 37 and 38 embedded in sleeve 30 connect electrodes 33 and 34 with equipment at the surface through cable 3 in the same manner as depicted in Fig. 1. Leads 37 and 38 are conveniently led along arms 25 and through case 21 to cable 3.

Depending upon the particular use that is to be made of the device, only a single set of electrodes such as 33 might be utilized or both sets 33 and 34 might be employed. In the preferred embodiment of the invention both sets are employed and in addition rod 26 is an insulated rod on the lower end of which is fitted an additional electrode which is connected electrically to surface equipment by means of lead 41 running up through rod 26, case 21 and cable 3. Thus electrodes 40, 33 and 34 correspond in their function to electrodes 7, 8 and 9 of Fig. 1.

The apparatus of the invention is depicted in its non-logging position in Figs. 2 and 3 and in this position is adapted to be lowered into the well to be logged. When the desired depth has been reached the tripping mechanism contained within case 21 rotates sleeve 27, releasing pins 28 from engagement with holes 29, thereby permitting arms 25 to move outwardly because of the tension exerted by springs 23, which are attached to the ends of arms 25 and to bracket 58. Since the arms 25 move independently of each other, each will move outwardly until it touches the walls of the bore hole, causing the upper rim of flexible sleeve 30 to conform to the cross section of the bore hole wall. *In other words, substantially the entire upper or leading edge of the sleeve will be brought into contact with the periphery of the bore hole.* As the assembly moves up the bore hole, drilling mud 2 will enter sleeve 30 and cause [it] *the sleeve* to contact the bore hole wall, thus bringing electrodes 33 and 34 into contact with the wall of the bore hole. As drilling mud reaches the bottom of the sleeve 30, the differential pressure resulting from upward motion of the sleeve will cause the lower end of the sleeve to pull free from holding means 31, thus allowing *substantially all of* the drilling mud to be bypassed through sleeve 30 at the device moves upwardly through the bore hole. Potential measurements are made in the conventional manner with electrodes 33 and 34, using a current introduced by electrode 40.

Figure 7:
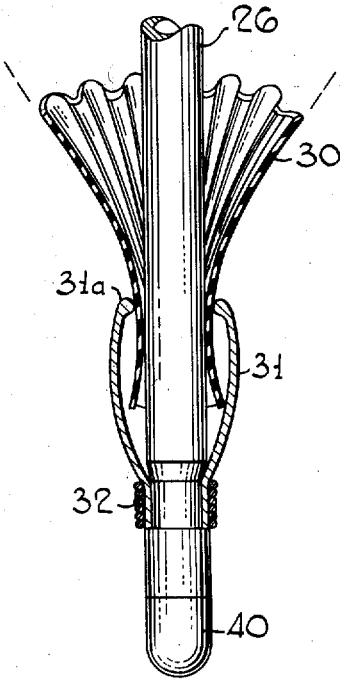
Fig. 7 is a detailed view of the lower end of the mechanism of Fig. 3, showing particularly the sleeve fastening means.
Figure 10:
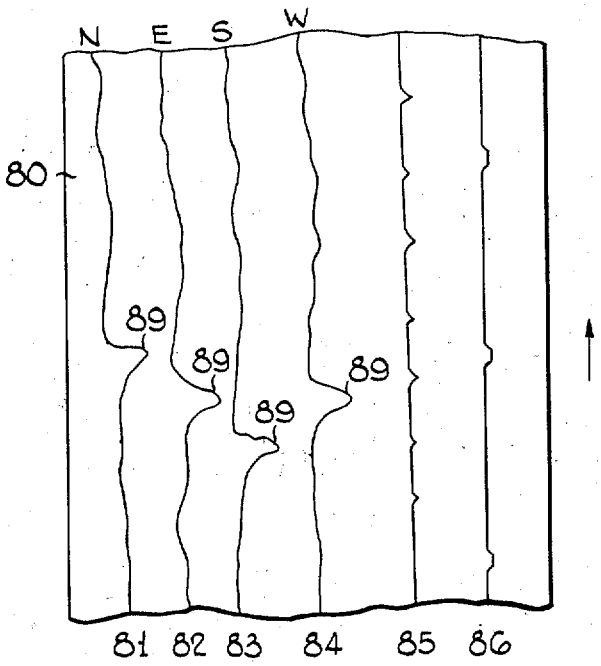
Fig. 10 is a view of a typical record obtained in a modification of the device of this invention to enable the determination of dip and strike of strata encountered.

Details of the holding means 31 and the manner in which it functions are illustrated in Fig. 7. Holding means 31 comprises a semi-rigid material such as heavy rubber or rubber-impregnated fabric which is tightly bound to rod 26 by means of wire or similar material 32. The wall thickness of means 31 is considerably [thicker] *greater* at its uppermost portion in order to form a rim 31a which will hold the lower end of the sleeve 30 against rod 26. The wall of holding means 31 is sufficiently flexible so that as sufficient mud pressure is built up inside the sleeve the lower end of the sleeve will be permitted to slide past rim 31a.

Figure 8:
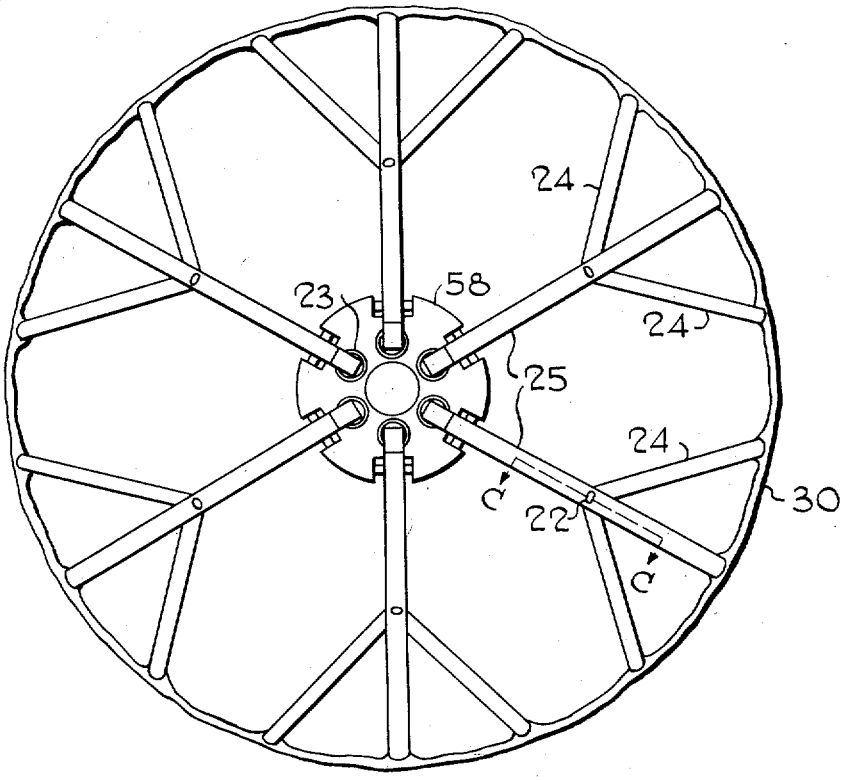
Fig. 8 is a cross sectional view taken along line B—B of Fig. 4.
Figure 9:
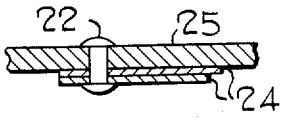
Fig. 9 is a cross sectional view taken along line C—C of Fig. 8.

To ensure that the *upper or* leading edge of *open* flexible sleeve 30 will follow the contour of bore hole 1 as the device is raised up through the bore hole, arms 25 are provided with shorter arms 24 which are pivotally fastened to arms 25 by means of pins 22. The short arms 24 are of flat cross-section as illustrated in Fig. 9, which is a cross-section taken along line C—C of Fig. 8. The ends of the short arms 24 are fastened to sleeve 30 at intermediate points between the ends of arms 25 so that as arms 25 are extended outwardly and sleeve 30 expands, arms 24, which normally fold beneath arms 25 when the latter arms are held in against the device, will be pulled out laterally and assist in holding the edges of sleeve 30 against the walls of the bore hole. Arms 24 are preferably made of spring steel or similar material to ensure maximum flexibility in following the contour of the hole.

Figure 4:
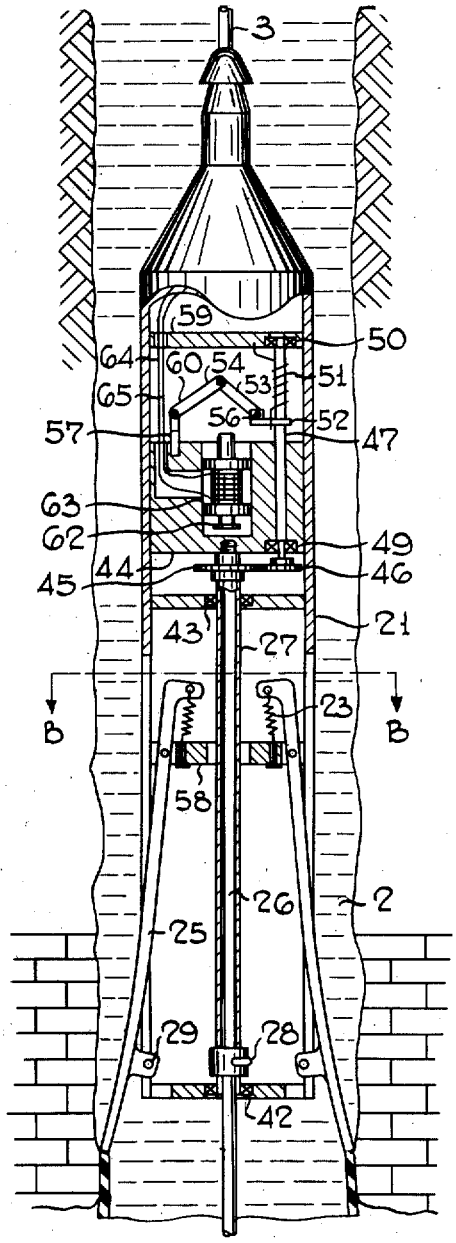
Figure 5:
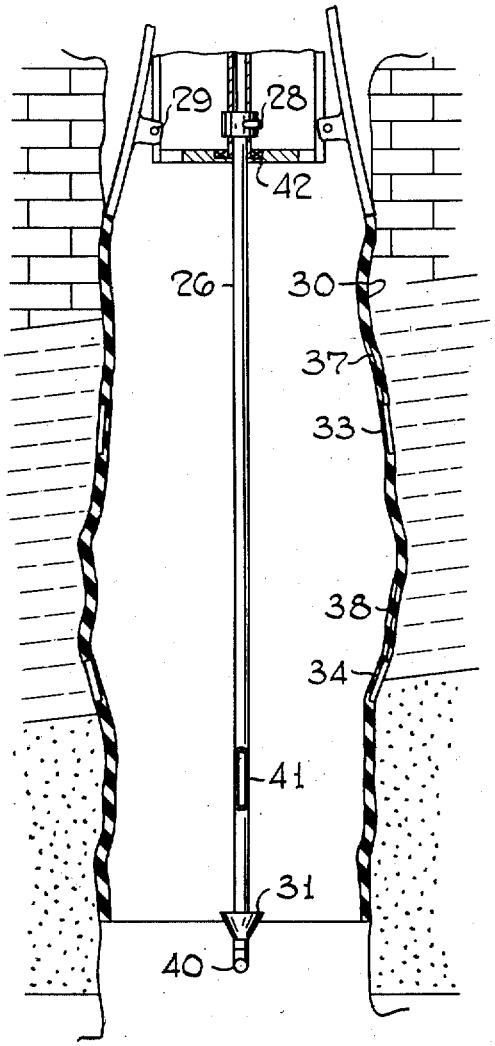

The mechanism for releasing arms 25 is also depicted in Figs. 2 and 4. Rotatable sleeve 27 is supported by bearings 42 and 43 and has attached to its upper end a gear 45 which meshes with a spur gear 46 attached to rotatable shaft 47, supported on bearings 49 and 50. A lever 52 extending at right angles to the axis of shaft 47 is secured to the shaft just above base 44. Spring 51, wound about shaft 47, has its upper end attached to support member 59 and its lower end secured to lever 52, so that spring 51 exerts a bias on shaft 47 in the clockwise direction, viewing shaft 47 from its lower end. A jointed bar 60 is provided, being constructed with arms 53 and 54 secured together by a pin 55. Arm 53 is secured to lever arm 52 of shaft 47 by pin 56 and arm 54 is secured to a portion of case 21 by pin 57.

The means for actuating the releasing mechanism consists of an armature 62 having a vertical axis and slidably arranged in a coil of wire 63. An electric current can be sent through coil 63 through leads 64 and 65 which run to the surface equipment through cable 3. Passage of such a current through coil 63 will cause armature 62 to be drawn upwardly so that it strikes the center of bar 60. The resulting movement of pivot 55 of jointed bar 60 above the line joining pivots 56 and 57 causes the bar to buckle because of the bias exerted by spring 51, thus causing shaft 47 to rotate through an angle of about 90°. Gear 46 likewise rotates through the same angle and causes gear 45 and sleeve 27 to rotate in the opposite direction through a sufficient angle to disengage pins 28 and holes 29 in the lower ends of arms 25, the gear ratio between gears 45 and 46 being so selected that the pins 28 will be pulled clear of arms 25.

The advantages of the present invention will be readily apparent to those skilled in the art of electric logging of wells. Since the electrodes 33 and 34 are in substantial contact with the walls of the bore hole at all times and are insulated from the main column of mud, the resistivity readings obtained will not be seriously affected by variations in hole size nor by mud in the hole. It is anticipated that sleeve 30 will not completely prevent mud from passing between the sleeve and the walls of the bore but nevertheless the amount of mud remaining in this vicinity will be so small and of such narrow cross section that its resistivity will be high, compared to that of the adjacent formation, so that the mud resistivity will be a negligible factor in the measurement. Since the sleeve can accommodate a large volume of drilling mud, the device will meet but little resistance on its way up the bore hole, thus permitting a rapid log of the bore hole to be made.

It is obvious that modification of the assembly described can be made without departing from the scope and spirit of the invention. For example by using three or four electrodes in each of the groups 33 and 34 and spacing the electrodes in each group uniformly in a horizontal plane about the circumference of sleeve 30 and providing separate electrical leads 37 and 38 from each individual electrode to surface instruments it is possible to obtain measurements that will be indicative of the dip and strike of strata encountered. Assume that four electrodes are used in each group and that they are designated as 33a, 33b, 33c, 33d, 34a, etc., 33a and 34a being in vertical relation to each other, 33b and 34b being similarly related, and so on, and that the potential measurement between 33a and 34a is recorded as one trace on a moving strip of paper, the potential between 33b and 34b as a second trace, and so on. Four traces will thus be recorded side by side on the record paper as shown in Fig. 9, 81 being the trace of the potential measured from electrodes 33a and 34a, 82 for electrodes 33b and 34b, and so on. A fifth trace, 85 may be made to show the orientation of one of the electrodes, say 33a with respect to North on the compass by providing wthin case 21 in the bore hole a suitable orienting apparatus, such as that described and claimed in the Boucher patent, 2,332,777, and tracing the impulses on moving paper 80 simultaneously with the other traces 81a, etc. A sixth trace 86 may designate the depth of the instrument at any time on the record by means well known in the art, or the depth may be recorded manually on the chart from readings of suitable depth measuring instruments.

Assume further, for the purpose of simplifying the explanation, that measurements on trace 85 indicate, by the method outlined in the aforementioned Boucher patent, that electrodes 33a and 34a are oriented North; then electrodes 33b and 34b will lie East, 33c and 34c South, and 33d and 34d West. With paper 80 moving in the direction indicated by the arrow, peaks 89 on traces 81, 82, etc. show that a stratum of different resistivity was encountered first by North electrodes 33a and 34a, then by East and West electrodes 33b, 34b, 33d, and 34d and finally by South electrodes 33c and 34c. This indicates that this particular stratum dips in a northerly direction.

It is not intended that the invention be restricted to the specific embodiments described, which have been presented merely by way of example. The invention is to be limited only by the following claims.

What is claimed is:

[1. An electrode assembly for the electric logging of bore holes comprising an elongated flexible insulating sleeve adapted to contact substantially the entire periphery of the bore hole, at least one electrode carried by said sleeve in a section intermediate its ends, said electrode being insulated from the interior of said sleeve but electrically accessible from the exterior of said sleeve, and means for supporting said sleeve in said bore hole and for pressing its upper periphery into contact with the periphery of the bore hole.]

[2. An electrode assembly according to claim 1 in which an additional electrode is supported adjacent the lower end of said sleeve on insulated supporting means disposed within said sleeve.]

3. An electrode assembly for the electric logging of bore holes comprising a supporting body adapted to be suspended within said bore hole on a cable, a plurality of arms pivotally attached to the lower portion of said body, each arm being adapted for independent movement outwardly from said body, means urging each of said arms outwardly from said body, an elongated flexible insulating sleeve attached at its upper end to the lower extremities of said arms, and at least one electrode carried by said sleeve in a section intermediate its ends, said electrode being insulated fromt he interior of said sleeve but electrically accessible from the exterior of said sleeve.

4. Electrode assembly according to claim 3 in which a plurality of electrically connected electrodes are carried by said sleeve about a horizontal periphery thereof.

5. Electrode assembly according to claim 3 in which said sleeve carries at least two groups of electrodes, the electrodes in each group being electrically connected to each other and disposed about a horizontal periphery of said sleeve, the electrode groups being placed in vertical relation to each other in a section intermediate the ends of the flexible sleeve.

6. Electrode assembly according to claim 3 in which an additional electrode is supported adjacent the lower end of said sleeve on an insulated supporting means disposed within said sleeve and attached to said supporting body.

7. An electrode assembly for the electric logging of bore holes comprising a supporting body adapted to be suspended within said bore hole on a cable, a plurality of arms pivotally attached to the lower portion of said body, spring means independently urging each of said arms outwardly from said body, releasable locking means for holding said arms inwardly in opposition to said spring means, electrically operable releasing means for said locking means, an elongated flexible insulating sleeve attached at its upper edge to the lower extremities of said arms, an elongated rod attached at its upper end to said supporting body and extending within said sleeve to a point adjacent the lower end thereof, yieldable fastening means attached to said elongated rod in a region adjacent its lower end, said fastening means being adapted to hold the lower end of said flexible sleeve and to release said lower sleeve end upon exertion of appreciable fluid pressure against the lower inner portion of said sleeve and at least one electrode carried by said flexible sleeve in a section intermediate its ends, said electrode being insulated from the interior of said sleeve but electrically accessible from the exterior of said sleeve.

8. Electrode assembly according to claim 7 in which said elongated rod is an insulated rod and in which an additional electrode is supported by the lower end of said insulated rod.

*9. An electrode assembly for the electric logging of bore holes comprising an open elongated flexible insulating sleeve adapted to contact substantially the entire periphery of the bore hole, at least one electrode carried by said sleeve in a section intermediate its ends, said electrode being insulated from the interior of said sleeve but electrically accessible from the exterior of said sleeve, means for supporting said sleeve in said bore hole and means for pressing substantially the entire upper edge of said sleeve into contact with the periphery of the bore hole, whereby substantially all of the fluid in the bore hole in the vicinity of the sleeve will pass through said sleeve as said sleeve is raised through the bore hole by said supporting means.*

*10. An electrode assembly according to claim 9, including insulated supporting means disposed within said sleeve and an additional electrode supported adjacent the lower end of said sleeve on said insulated supporting means.*

ALEXANDER B. HILDEBRANDT.

REFERENCES CITED

The following references are of record in the file of this patent:

UNITED STATES PATENTS

| Number | Name | Date |
|---|---|---|
| 2,102,080 | Kinley | Dec. 14, 1937 |
| 2,388,896 | Aiken | Nov. 13, 1945 |
| 2,392,357 | Bays | Jan. 8, 1946 |
| 2,502,775 | Brandon | Apr. 4, 1950 |